United States Patent
Cravener et al.

(10) Patent No.: US 10,583,916 B2
(45) Date of Patent: *Mar. 10, 2020

(54) METHOD AND APPARATUS FOR PROXIMITY CONTROL BETWEEN ROTATING AND NON-ROTATING AIRCRAFT COMPONENTS

(71) Applicant: Bell Helicopter Textron Inc., Fort Worth, TX (US)

(72) Inventors: Kyle Thomas Cravener, Arlington, TX (US); Brady Garrett Atkins, Euless, TX (US); Stuart Benjamin Cook, Dallas, TX (US); Joaquin Vargas Calvet, Richardson, TX (US); Andrew Michael White, Dallas, TX (US); Karl Bailey, Windham, NH (US); Corrine Jagneaux, Richardson, TX (US); Maika Lopati Mauga, Garland, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/401,332

(22) Filed: May 2, 2019

(65) Prior Publication Data

US 2020/0001979 A1    Jan. 2, 2020

Related U.S. Application Data

(63) Continuation-in-part of application No. 16/024,986, filed on Jul. 2, 2018.

(51) Int. Cl.
*B64C 27/06* (2006.01)
*B64C 13/16* (2006.01)
(Continued)

(52) U.S. Cl.
CPC ............ *B64C 13/16* (2013.01); *B06B 1/0688* (2013.01); *B64C 11/06* (2013.01); *B64C 11/301* (2013.01);
(Continued)

(58) Field of Classification Search
CPC ....... B64C 27/008; B64C 27/57; B64C 27/06; B64C 29/0033; B64C 39/024;
(Continued)

(56) References Cited

U.S. PATENT DOCUMENTS 5,749,540 A * 5/1998 Arlton ..................... B64C 27/82
244/17.13
6,322,324 B1 * 11/2001 Kennedy ............... B64C 27/001
244/17.13
(Continued)

FOREIGN PATENT DOCUMENTS

DE     102006037900 A1    2/2008
EP          2738090 A2    6/2014
WO    WO-2018081802 A1    5/2018

OTHER PUBLICATIONS

Pearson et al., Active control of helicopter vibration, 1994, IEEE, p. 277-284 (Year: 1994).*

(Continued)

*Primary Examiner* — McDieunel Marc
(74) *Attorney, Agent, or Firm* — Winstead PC

(57) ABSTRACT

The aircraft includes a rotor. The rotor includes a plurality of rotor blades. The aircraft further includes a non-rotating aircraft component. A proximity sensor is disposed with at least one of the non-rotating aircraft component and the rotor blades. A flight control computer is electrically coupled to the proximity sensor.

20 Claims, 13 Drawing Sheets

(51) Int. Cl.
B64C 27/00 (2006.01)
B64C 27/52 (2006.01)
B64C 11/06 (2006.01)
B06B 1/06 (2006.01)
B64C 11/30 (2006.01)
B64C 19/02 (2006.01)

(52) U.S. Cl.
CPC ............ B64C 11/305 (2013.01); B64C 19/02 (2013.01); B64C 27/008 (2013.01); B64C 27/52 (2013.01)

(58) Field of Classification Search
CPC ....... B64C 39/001; B64C 27/08; B64C 27/82; B64D 45/08; G08G 5/0078; G01S 13/87
See application file for complete search history.

(56) References Cited

U.S. PATENT DOCUMENTS

| | | | |
|---|---|---|---|
| 9,213,096 B2* | 12/2015 | Kreitmair-Steck | G01S 13/87 |
| 9,767,423 B2 | 9/2017 | Lord et al. | |
| 9,997,078 B2 | 6/2018 | Gadgil et al. | |
| 10,002,333 B2 | 6/2018 | Lord et al. | |
| 10,118,696 B1* | 11/2018 | Hoffberg | B64C 39/001 |
| 10,176,723 B2 | 1/2019 | Gadgil et al. | |
| 10,293,928 B2* | 5/2019 | Vetter | B64C 27/30 |
| 2010/0047067 A1 | 2/2010 | Houser et al. | |
| 2010/0252690 A1* | 10/2010 | Hothi | B64C 39/024 244/7 B |
| 2016/0288922 A1* | 10/2016 | He | B64D 45/08 |
| 2016/0347446 A1* | 12/2016 | Vetter | B64C 27/30 |
| 2017/0210463 A1 | 7/2017 | Koessick et al. | |
| 2017/0235018 A1* | 8/2017 | Foster | B64C 39/024 702/5 |
| 2018/0050795 A1 | 2/2018 | Geiger et al. | |
| 2018/0075762 A1* | 3/2018 | Gadgil | G08G 5/0078 |
| 2019/0127056 A1* | 5/2019 | Weekes | B64C 27/08 |

OTHER PUBLICATIONS

Bae et al., Development of small flying robot with rotary wing and autonomous control system, 2008, IEEE, p. 1815-1820 (Year: 2008).*
Balke, V-22 mechanical diagnostic design approach, 1991, IEEE, p. 21-27 (Year: 1991).*
Pizetta et al., A hardware-in-loop platform for rotary-wing unmanned aerial vehicles, 2014, IEEE, p. 1146-1157 (Year: 2014).*
Cravener, Kyle Thomas, "U.S. Appl. No. 16/024,986," filed Jul. 2, 2018.

* cited by examiner

METHOD AND APPARATUS FOR PROXIMITY CONTROL BETWEEN ROTATING AND NON-ROTATING AIRCRAFT COMPONENTS

CROSS-REFERENCE TO RELATED APPLICATIONS

This patent application is a continuation-in-part of U.S. patent application Ser. No. 16/024,986, filed on Jul. 2, 2018, which patent application is incorporated herein by reference.

TECHNICAL FIELD

The present disclosure relates generally to rotor-driven aircraft and more particularly, but not by way of limitation, to measurement and control systems in rotor-driven aircraft for measuring and controlling distance between rotor blades and non-rotating aircraft components.

BACKGROUND

This section provides background information to facilitate a better understanding of the various aspects of the disclosure. It should be understood that the statements in this section of this document are to be read in this light, and not as admissions of prior art.

Tilt-rotor and rotor-wing aircraft include an airframe and at least one rotor assembly having a plurality of rotor blades. During operation, it is common for the rotor assembly to experience coning or flapping, which causes displacement of the rotor blades relative to non-rotating components of the aircraft. Such displacement can bring the rotor blades within a minimum safe distance of the non-rotating components of the aircraft. Previously, rotor-blade-clearance has been addressed by pilot training, flight control software, and/or extending the rotor assembly further away from the non-rotating components of the aircraft. However, this approach introduces additional weight to the aircraft and can have an undesirable impact on aerodynamics of the aircraft.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

An illustrative aircraft includes a rotor having a plurality of rotor blades, a non-rotating aircraft component, a first proximity sensor disposed in the non-rotating aircraft component, and a flight control computer in communication with the first proximity sensor. The proximity sensor can comprise one or more of an ultrasonic sensor, a pressure sensor, a LiDAR sensor, or a tripwire.

An illustrative flight control system includes a pilot control, a flight control computer electrically coupled to the pilot control, at least one of an actuator and a servo motor electrically coupled to the flight control computer, the at least one of the actuator and the servo motor operable to control a flight parameter, a proximity sensor disposed in a non-rotating aircraft component and electrically coupled to the flight control computer, and wherein, the flight control computer is operable to signal the actuator to alter the flight parameter in response to a rotor blade being within a minimum safe distance of the non-rotating aircraft component. The proximity sensor can comprise one or more of an ultrasonic sensor, a pressure sensor, a LiDAR sensor, or a tripwire.

An illustrative method of controlling rotor-blade clearance includes measuring, via a proximity sensor, a position of a rotor blade relative to a non-rotating aircraft component; determining, via a flight control computer, if the rotor blade is outside of a minimum safe distance of the non-rotating aircraft component; and responsive to a determination that the rotor blade is within a minimum safe distance of the non-rotating aircraft component, initiating, via the flight control computer a corrective action. The proximity sensor can comprise one or more of an ultrasonic sensor, a pressure sensor, a LiDAR sensor, or a tripwire.

Various aspects of the disclosure relate to a flight control system. The flight control system includes a pilot control. A flight control computer is electrically coupled to the pilot control. At least one of an actuator and a servo motor are electrically coupled to the flight control computer. The at least one of the actuator and the servo motor are operable to control a flight parameter. A proximity sensor is disposed with at least one of a non-rotating aircraft component and a tip region of a rotor blade. The proximity sensor is electrically coupled to the flight control computer. The flight control computer is operable to signal the actuator to alter the flight parameter in response to the rotor blade being within a minimum safe distance of the non-rotating aircraft component.

Various aspects of the disclosure relate to a method of controlling rotor-blade clearance. The method includes measuring, via a proximity sensor, a position of a rotor blade relative to a non-rotating aircraft component. A measured position of the rotor blade is transmitted to a flight control computer. It is determined, via the flight control computer, if the rotor blade is outside of a minimum safe distance of the non-rotating aircraft component. Responsive to a determination that the rotor blade is within a minimum safe distance of the non-rotating aircraft component, a corrective action is initiated via the flight control computer.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

Figure 1:
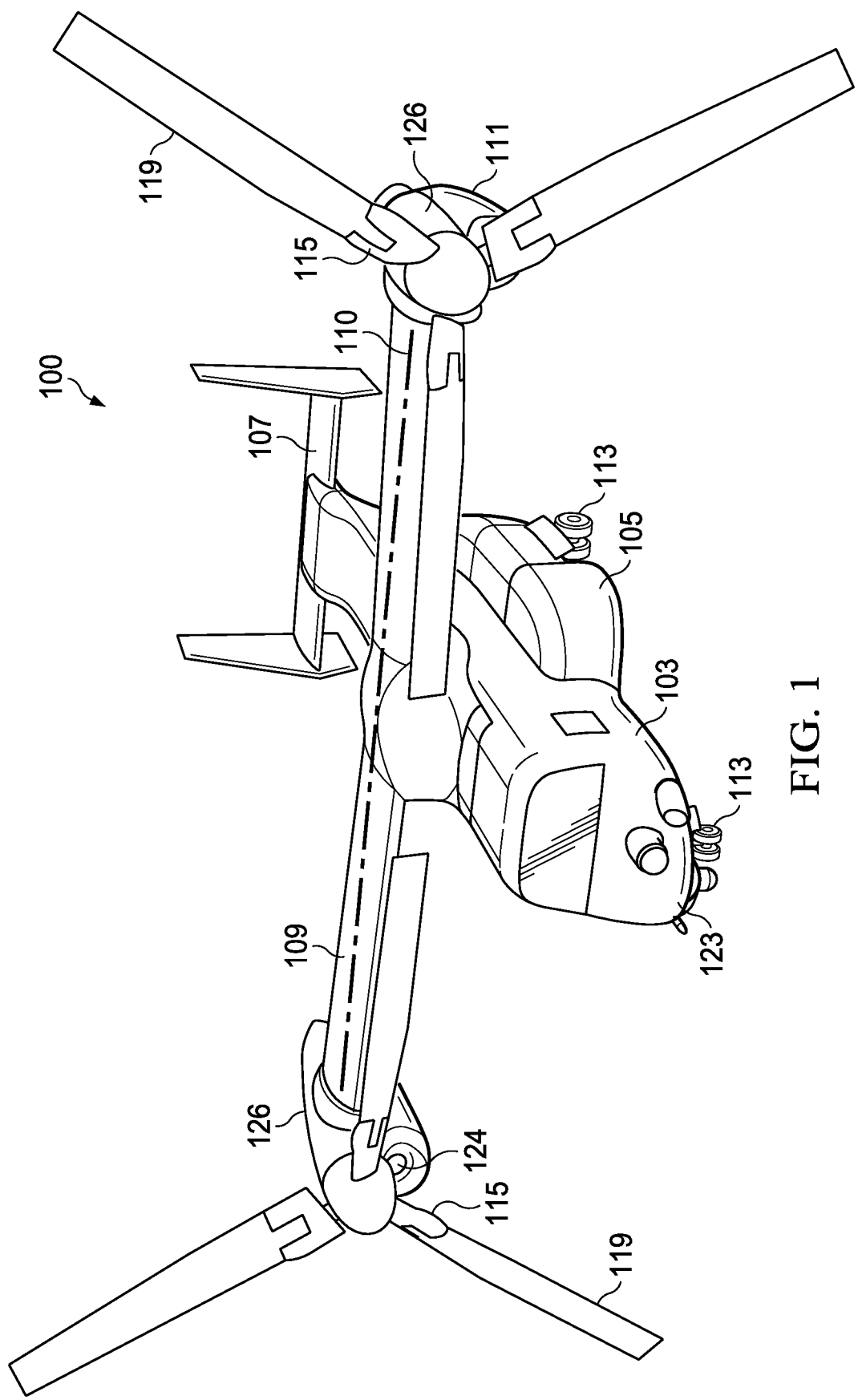
FIG. 1 is a perspective view of a tilt-rotor aircraft in airplane mode according to aspects of the disclosure.

FIG. 1 is a perspective view of a tilt-rotor aircraft 100 in airplane mode. The tilt-rotor aircraft 100 includes a fuselage 103, a sponson 105, a tail member 107, a wing 109, a propulsion system 111, and a landing gear 113. The fuselage 103 represents the body of the tilt-rotor aircraft 100. The wing 109 is coupled to the propulsion system 111 such that the propulsion system 111 provides at least one of lift and thrust to the tilt-rotor aircraft 100. By way of example in FIG. 1, the wing 109 is illustrated as a single-wing assembly; however, in other embodiments, the wing 109 could include a dual-wing assembly. Although the disclosure refers to use in conjunction with the tilt-rotor aircraft 100, a person of skill in the art will recognize that certain aspects of the disclosure could be utilized in connection with any type of aircraft to include rotor-wing and fixed-wing aircraft.

The propulsion system 111 includes an engine 124 housed within a nacelle 126. The propulsion system 111 includes a pivotable rotor 115 operatively connected to the engine 124. In various embodiments, the rotor 115 may be, for example, a helicopter rotor, a propeller, or a proprotor of the type used, for example, in tilt-rotor aircraft. In various embodiments, the engine 124 and the nacelle 126 pivot about a long axis 110 of the wing 109 so as to orient the rotor 115 between an airplane mode (also commonly referred to as "cruise mode") and a helicopter mode (also commonly referred to a vertical take-off and landing ("VTOL") mode). The rotor 115 has a plurality of rotor blades 119 associated therewith. A position of the rotor 115, as well as a pitch of the rotor blades 119, can be selectively controlled via, for example, cyclic or collective controls by a pilot to determine heading, thrust, and lift of the tilt-rotor aircraft 100. By way of example, FIG. 1 illustrates the tilt-rotor aircraft 100 in the airplane mode, in which the rotor 115 is arranged in a substantially forward-facing orientation to impart a forward thrust to the tilt-rotor aircraft 100. A lifting force is supplied by the wing 109. When in the helicopter mode, the rotor 115 is positioned in a substantially vertical orientation so as to impart a lifting thrust to the tilt-rotor aircraft 100. In various embodiments, the tilt-rotor aircraft 100 can be operated such that the rotor 115 is selectively positioned between the airplane mode and the helicopter mode, which is referred to as a conversion mode.

Figure 2:
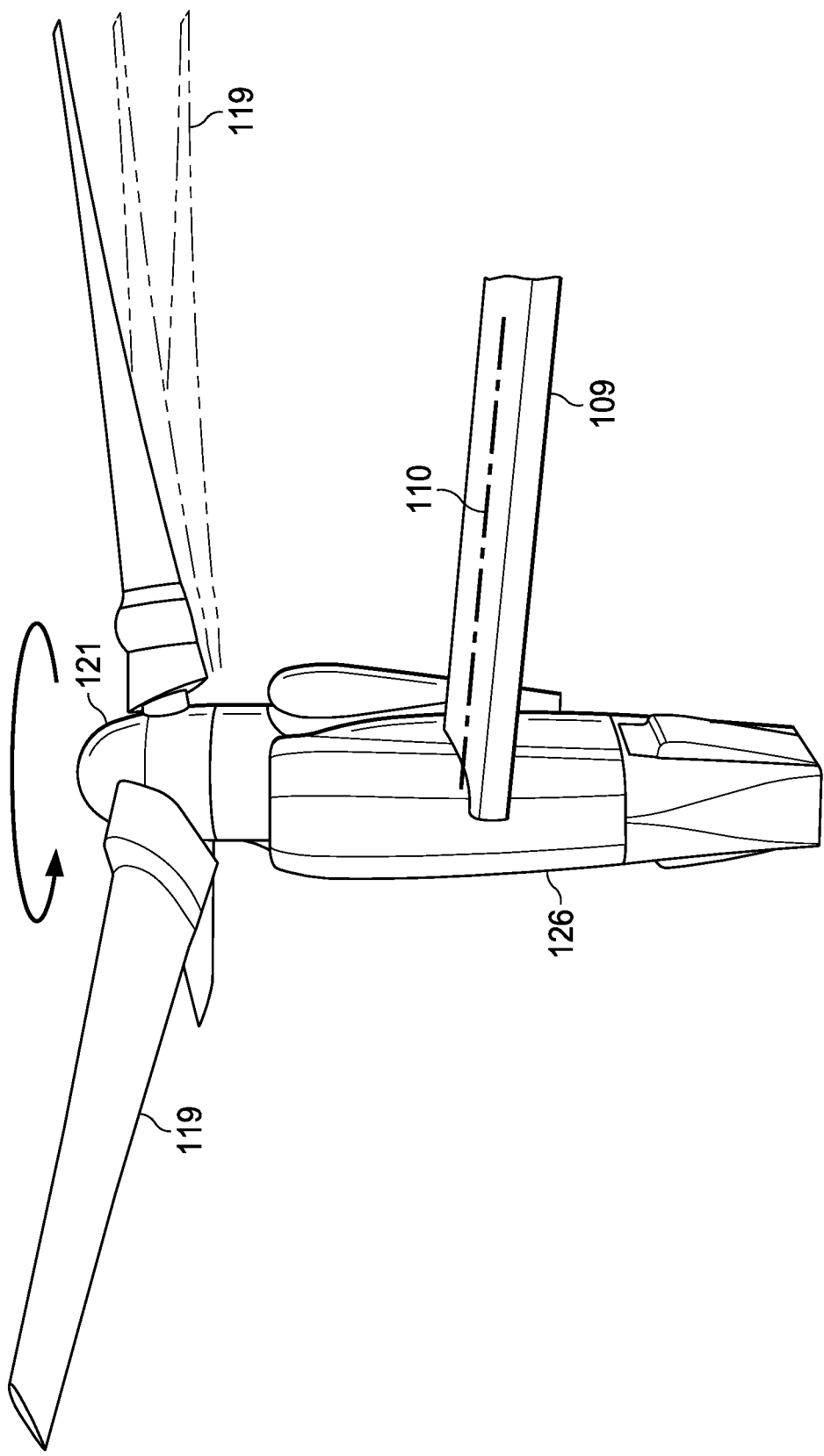
FIG. 2 is an enlarged perspective view of a nacelle and wing structure of a tilt-rotor aircraft in helicopter mode according to aspects of the disclosure.

FIG. 2 is an enlarged perspective view of the nacelle 126 and the wing 109 of the tilt-rotor aircraft 100 in the helicopter mode. For purposes of discussion, FIG. 2 is described herein relative to FIG. 1. In the helicopter mode, the nacelle 126 rotates about the long axis 110 of the wing 109 to a vertically-aligned position such that the rotor blades 119 rotate in a plane that is generally parallel to a plane of the wing 109. During operation in at least one of the airplane mode and the helicopter mode, asymmetric aerodynamic forces acting on the rotor blades 119 cause the rotor blades 119 to deflect. In various embodiments, deflections of the rotor blades 119 may be the result of, for example, "coning" or "flapping." "Coning" refers to a tendency of the rotor blades 119 to assume a conical path instead of remaining in a plane that is generally perpendicular to a mast. "Flapping" refers to an upward or downward movement of the rotor blades 119 that eliminates dissymmetry of lift. For example, in forward flight, the rotor blades 119 experience greater lift forces as they rotate forward towards the nose 123 of the tilt-rotor aircraft 100. The increased lift causes the tips of the rotor blades 119 to displace upwardly over the nose 123 of the tilt-rotor aircraft 100 and to displace downwardly over the tail member 107 of the tilt-rotor aircraft 100. Such displacement of the rotor blades 119 relative to the fuselage 103, the wing 109, and other non-rotating components of the tilt-rotor aircraft 100 can cause the rotor blades 119 to come within a minimum safe distance of non-rotating components of the tilt-rotor aircraft 100.

Figure 3:
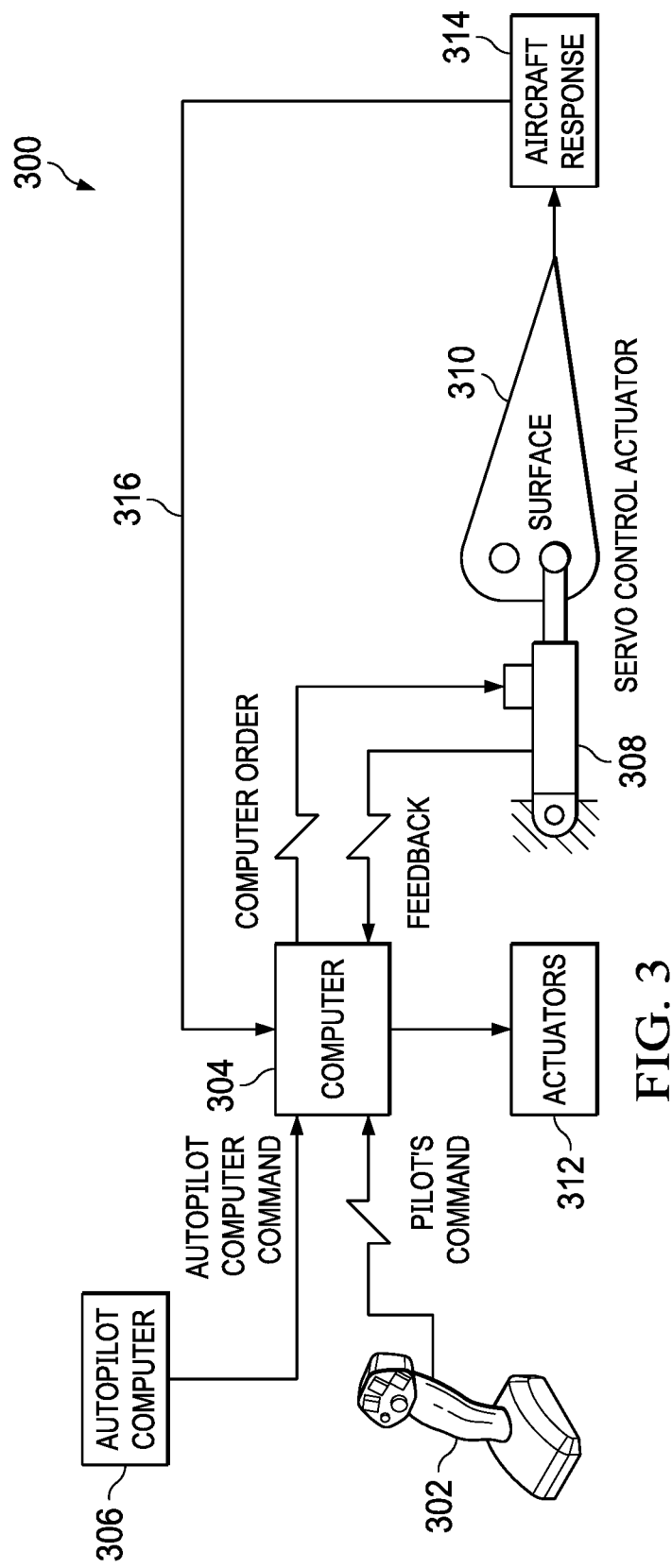
FIG. 3 is a block diagram of a flight control system according to aspects of the disclosure.

FIG. 3 is a block diagram of a flight control system 300 associated with the tilt-rotor aircraft 100. For purposes of discussion, FIG. 3 is described herein relative to FIGS. 1-2. Pilot controls 302 provide flight commands to a flight control computer 304. In various embodiments, the flight control system 300 may include multiple redundant flight control computers 304. In various embodiments, the flight commands may include, for example, airspeed, pitch, roll, yaw, rate of climb, heading, and rotor position. In some embodiments, an autopilot system 306 may also provide flight commands to the flight control computer 304. The flight control computer 304 interprets the flight commands and signals servo motors 308 which actuate control surfaces 310 such as, for example ailerons, flaps, elevators, and rudder. In other embodiments, the servo motors 308 may also control, for example, a position of the landing gear 113. The flight control computer 304 may also signal actuators 312, which control an angular position of the nacelles 126 as well as an angle of attack of the rotor blades responsive to, for example, collective or cyclic commands received from either the pilot controls 302 or the autopilot system 306. In various embodiments, the actuators 312 could be, for example, electric motors and may in various embodiments be, for example, swashplate actuators, nacelle-position acutators, throttle actuators, landing-gear actuators, or any other type of actuator for controlling a flight parameter.

Still referring to FIG. 3, the flight control computer 304 measures a response 314 of the tilt-rotor aircraft 100. In various embodiments, the flight control computer 304 measures the aircraft response 314 by measuring flight parameter such as, for example, actual rate of climb, actual airspeed, actual heading, and other flight parameters. The flight control computer 304 receives feedback 316 related to actual performance of the tilt-rotor aircraft 100. In various embodiments, the flight control computer 304 may adjust at least one of the control surfaces 310 or the position of the rotors 115 to minimize differences between a commanded performance of the tilt-rotor aircraft 100 and an actual performance of the tilt-rotor aircraft 100. In various embodiments, the flight control computer 304 may adjust at least one flight parameter to mitigate an unsafe condition.

Figure 4:
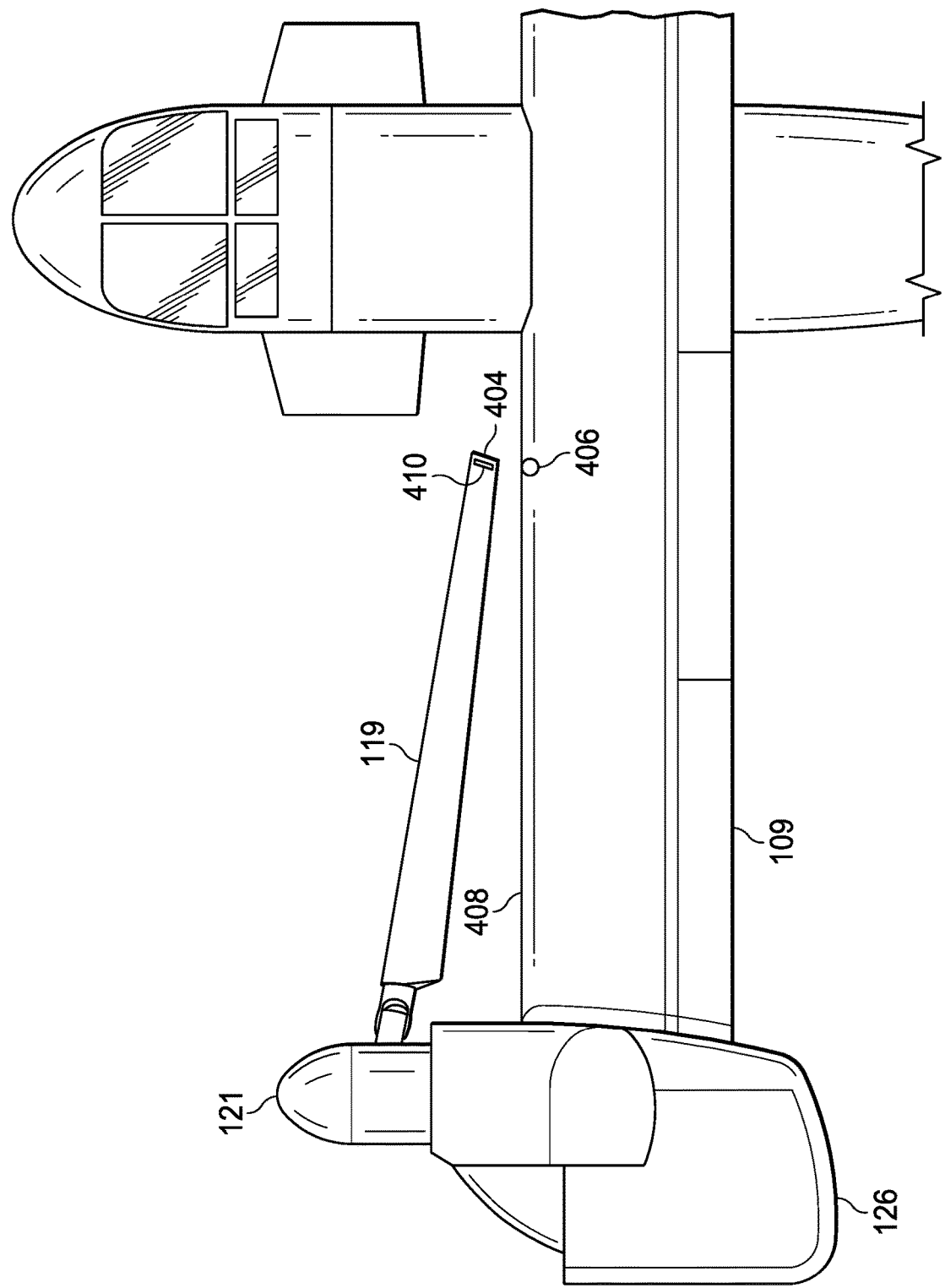
FIG. 4 is a partial top view of a wing of a tilt-rotor aircraft showing the nacelle in the airplane mode according to aspects of the disclosure.

FIG. 4 is a partial top view of the wing 109 of the tilt-rotor aircraft 100 showing the nacelle 126 in the airplane mode. For purposes of discussion, FIG. 4 is described herein relative to FIGS. 1-3. When operating in the airplane mode, certain flight maneuvers can introduce asymmetric forces to the rotor blades 119 causing the rotor hub 121 to experience flap similar to operation in the helicopter mode. When operating in the airplane mode, rotor flap can bring the rotor blades 119 into proximity of non-rotating aircraft components such as, for example, a sponson 105, the fuselage 103, the wing 109, or a wing extension 702.

Still referring to FIG. 4, a proximity sensor 406 is embedded into at least one of a tip region 404 of the rotor blades 119 and the non-rotating aircraft component. By way of example, in FIG. 4, the proximity sensor 406 is embedded in a leading edge 408 of the wing 109. An antenna 410 is embedded in the tip region 404 of the rotor blades 119. In various embodiments, the proximity sensor 406 is an electromagnetic sensor or an inductive sensor. In other embodiments, the proximity sensor could be, for example, a radar sensor or a light detection and ranging (LiDAR) sensor. During operation, the proximity sensor 406 excites the antenna and detects reflections from the antenna 410. Such a process allows the proximity sensor 406 to measure a distance between the proximity sensor 406 and the antenna 410. In embodiments, where the proximity sensor 406 is, for example a radar sensor or a LiDAR sensor, the proximity sensor 406 emits a signal such as, for example, a radio wave or a light wave and measures reflections from the tip region of the rotor blades 119. In such embodiments, the proximity sensor 406 may be disposed in the leading edge 408 of the wing 109 or in the leading or trailing edge of the tip region 404 of the rotor blades 119. In such embodiments utilizing a radar or LiDAR proximity sensor 406, the antenna 410 may be omitted. The proximity sensor 406 is operatively coupled to the flight control computer 304. The proximity sensor 406 transmits a measured distance between the rotor blade 119 and the non-rotating component of the tilt-rotor aircraft 100 to the flight control computer 304. As will be discussed in more detail below, the proximity sensor 406 may, in various embodiments, be utilized to measure a distance between the rotor blades 119 and any non-rotating component of the tilt-rotor aircraft 100.

Figure 5:
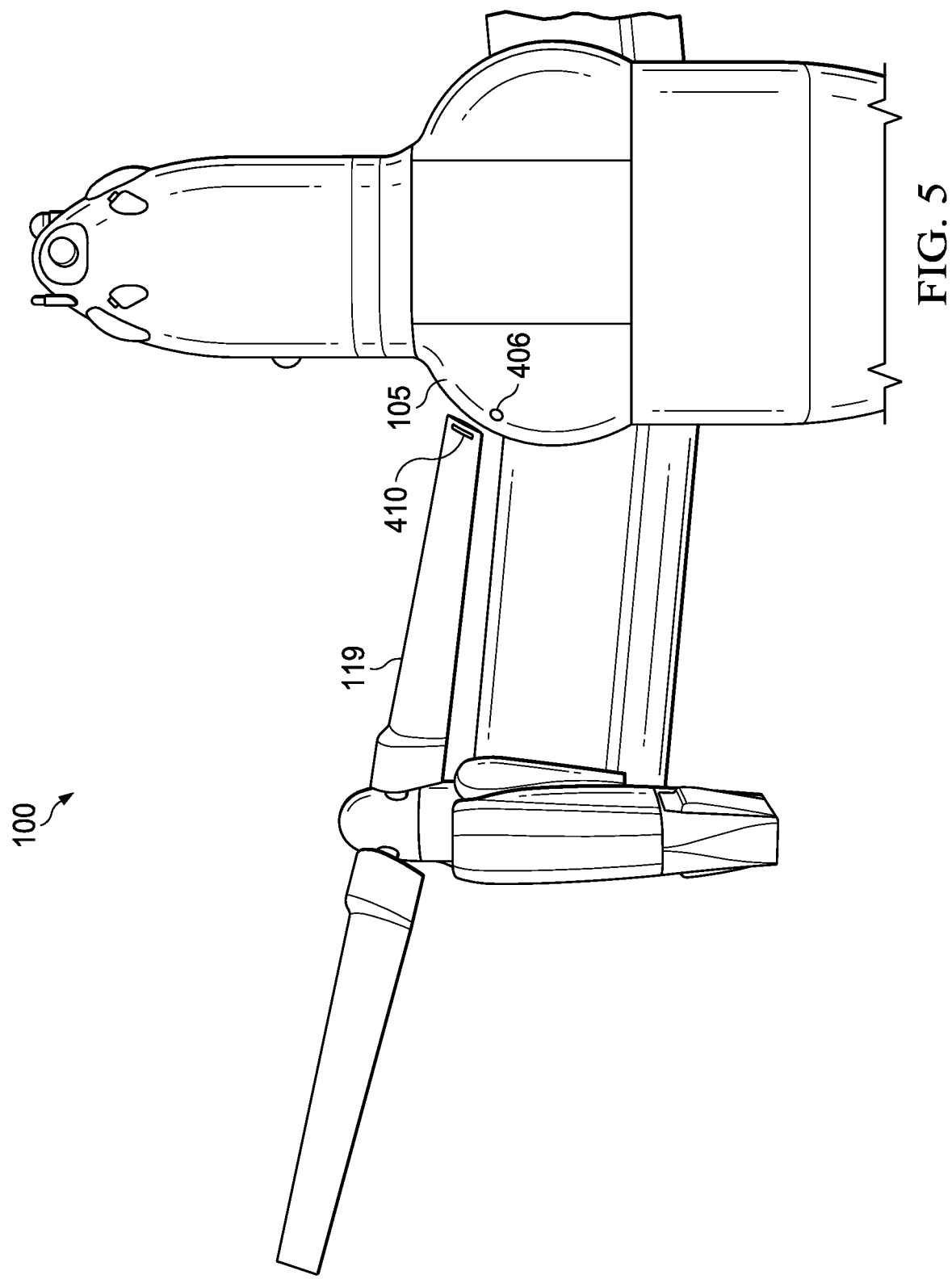
FIG. 5 is a partial bottom view of a tilt-rotor aircraft in airplane mode illustrating clearance between a rotor blade and a sponson according to aspects of the disclosure.

FIG. 5 is a partial bottom view of the tilt-rotor aircraft 100 operating in the airplane mode and illustrating a clearance between the rotor blades 119 and a sponson 105. For purposes of discussion, FIG. 5 is described herein relative to FIGS. 1-4. The proximity sensor 406 is embedded in an exterior surface of the sponson 105 and the antenna 410 is embedded in the tip region 404 of the rotor blades 119. In embodiments, where the proximity sensor 406 is, for example a radar sensor or a LiDAR sensor, proximity sensor 406 may be disposed in the sponson 105 or in the leading or trailing edge of the tip region 404 of the rotor blades 119. In such embodiments utilizing a radar or LiDAR proximity sensor 406, the antenna 410 may be omitted. The proximity sensor 406 transmits a measured distance between the rotor blade 119 and the sponson 105 to the flight control computer 304.

Figure 6:
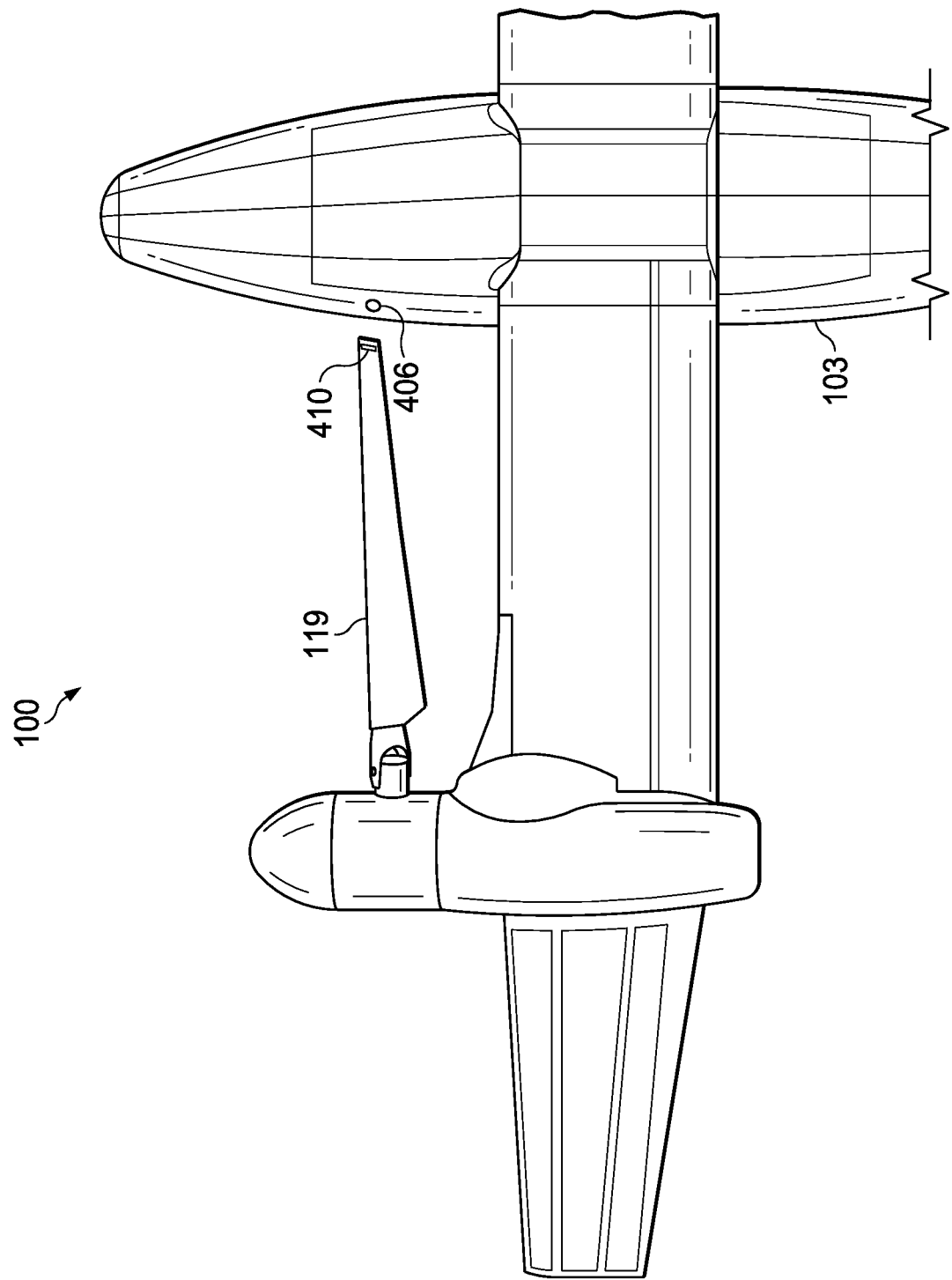
FIG. 6 is a partial top view of a tilt-rotor aircraft in airplane mode illustrating clearance between a rotor blade and a fuselage according to aspects of the disclosure.

FIG. 6 is a partial top view of the tilt-rotor aircraft 100 operating in the airplane mode illustrating clearance between the rotor blades 119 and the fuselage 103. For purposes of discussion, FIG. 6 is described herein relative to FIGS. 1-4. The proximity sensor 406 is embedded in an exterior surface of the fuselage 103 and the antenna 410 is embedded in the tip region 404 of the rotor blades 119. In embodiments, where the proximity sensor 406 is, for example a radar sensor or a LiDAR sensor, proximity sensor 406 may be disposed in the fuselage 103 or in the leading or trailing edge of the tip region 404 of the rotor blades 119. In such embodiments utilizing a radar or LiDAR proximity sensor 406, the antenna 410 may be omitted. The proximity sensor 406 transmits a measured distance between the rotor blade 119 and the fuselage 103 to the flight control computer 304.

Figure 7:
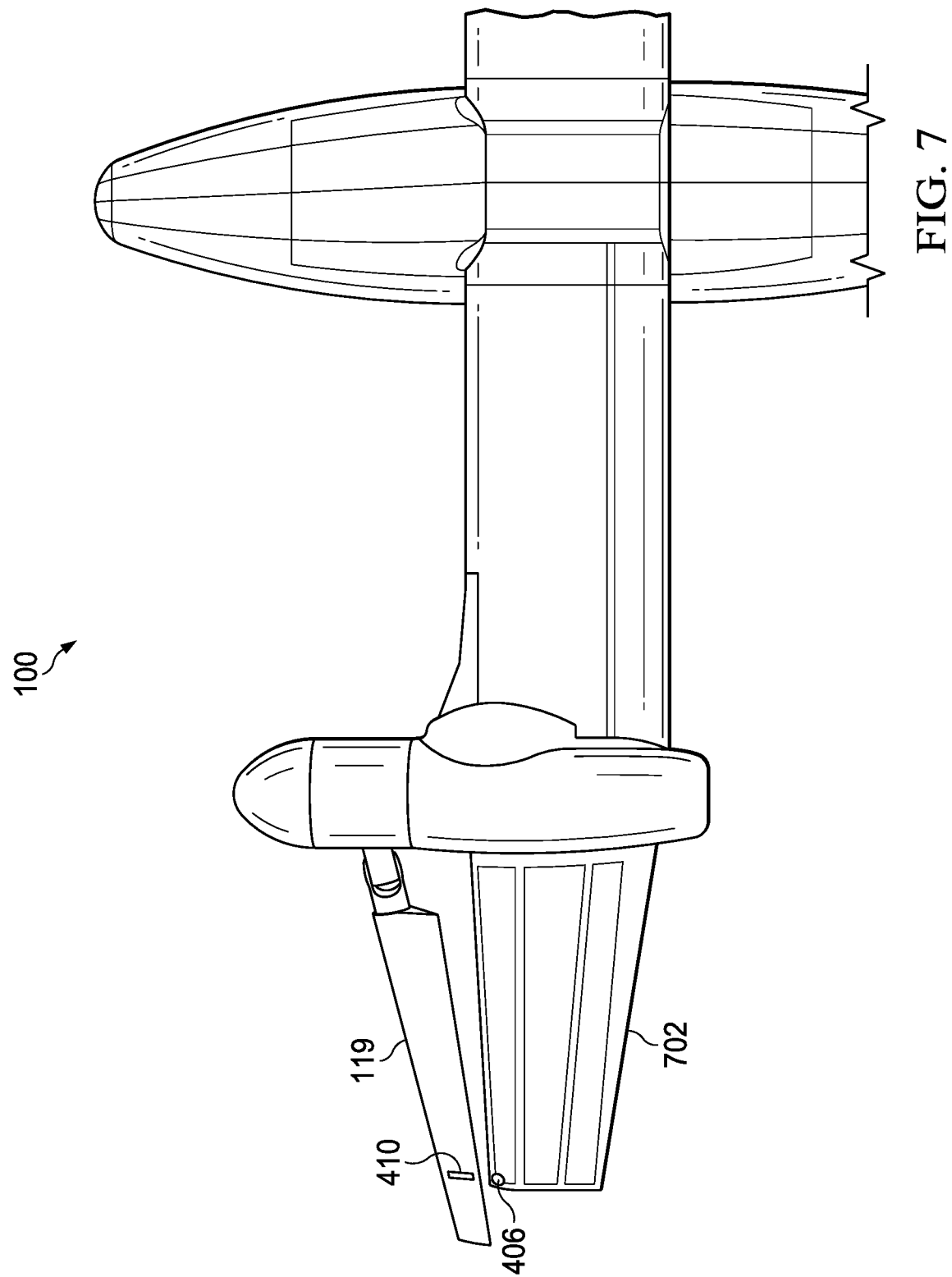
FIG. 7 is a partial top perspective view of a tilt-rotor aircraft in airplane mode illustrating clearance between a rotor blade and a wing extension according to aspects of the disclosure.

FIG. 7 is a partial top perspective view of the tilt-rotor aircraft 100 in airplane mode illustrating clearance between the rotor blades 119 and a wing extension 702. For purposes of discussion, FIG. 7 is described herein relative to FIGS. 1-4. In various embodiments, a wing extension 702 may extend laterally from the nacelle 126. The proximity sensor 406 is embedded in a leading edge of the wing extension 702 and the antenna 410 is embedded in the tip region 404 of the rotor blades 119. In various embodiments utilizing a radar or LiDAR proximity sensor 406, the proximity sensor 406 may be disposed in the wing extension 702 or the trailing edge or the leading edge of the tip region 404 of the rotor blades 119. In such embodiments utilizing a radar or LiDAR proximity sensor 406, the antenna 410 may be omitted. The proximity sensor 406 transmits a measured distance between the rotor blade 119 and the wing extension 702 to the flight control computer 304.

Figure 8:
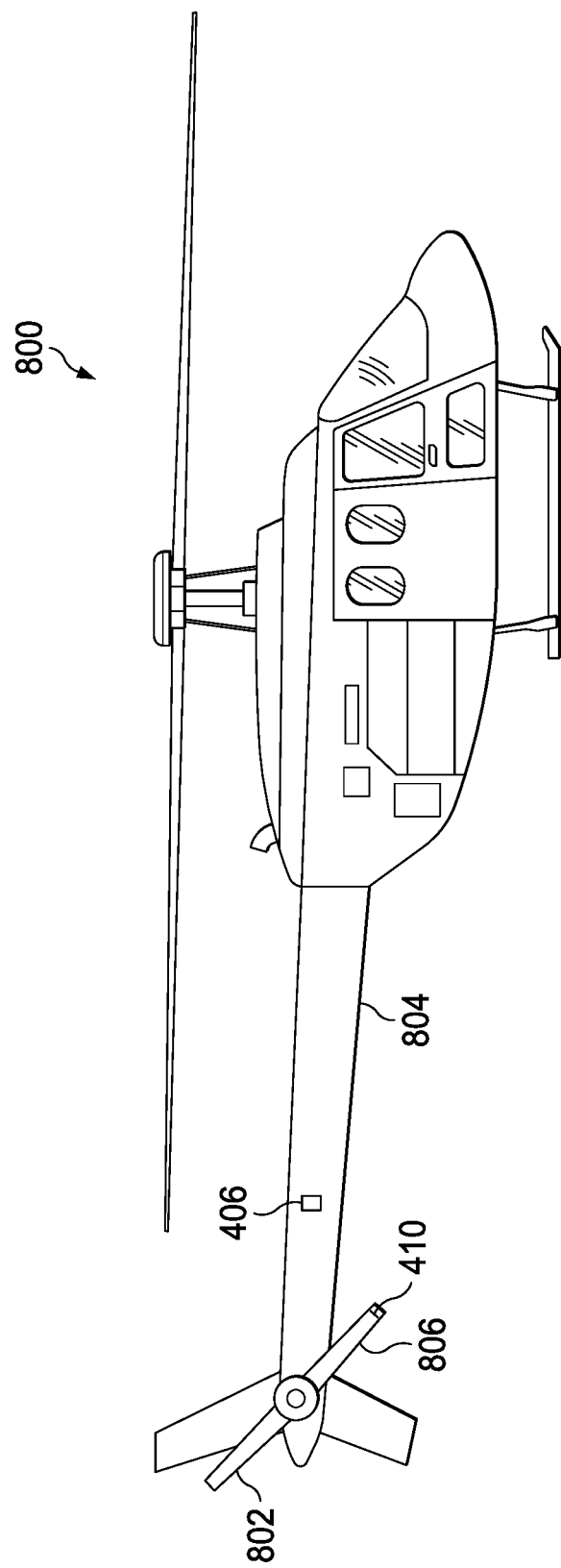
FIG. 8 is a perspective view of a rotor-wing aircraft illustrating clearance between a tail rotor and a tail boom according to aspects of the disclosure.

FIG. 8 is a partial perspective view of a rotor-wing aircraft 800 illustrating clearance between a tail rotor 802 and a tail boom 804. For purposes of discussion, FIG. 8 is described herein relative to FIG. 4. Although the proximity sensor 406 and the antenna 410 have been described herein as being used in conjunction with the tilt-rotor aircraft 100, one skilled in the art will recognize that the proximity sensor 406 could be utilized to measure a distance between rotating aircraft components and non-rotating aircraft components of any type of aircraft including, for example, rotor-wing aircraft, fixed-wing aircraft, and tilt-rotor aircraft. In the case of the rotor-wing aircraft 800, the proximity sensor 406, in various embodiments, may be embedded in an exterior surface of the tail boom 804 and the antenna 410 may be embedded in a tip region 806 of the tail rotor 802. In embodiments, where the proximity sensor 406 is, for example a radar sensor or a LiDAR sensor, proximity sensor 406 may be disposed in the tail boom 804 or in the leading or trailing edge of the tip region 806 of the tail rotor 802. In such embodiments utilizing a radar or LiDAR proximity sensor 406, the antenna 410 may be omitted. The proximity sensor 406 transmits a measured distance between the tail rotor 802 and the tail boom 804 to the flight control computer 304.

Still referring to FIG. 8, a clearance between a main rotor 808 and a fuselage 810 is also illustrated. The proximity sensor 406, in various embodiments, may be embedded in an exterior surface of the fuselage 810 and the antenna 410 may be embedded in a tip region 812 of the main rotor 808. In embodiments, where the proximity sensor 406 is, for example a radar sensor or a LiDAR sensor, proximity sensor 406 may be disposed in the fuselage 810 or in the leading or trailing edge of the tip region 812 of the main rotor 808. In such embodiments utilizing a radar or LiDAR proximity sensor 406, the antenna 410 may be omitted. The proximity sensor 406 transmits a measured distance between the main rotor 808 and the fuselage 810 to the flight control computer 304.

Figure 9:
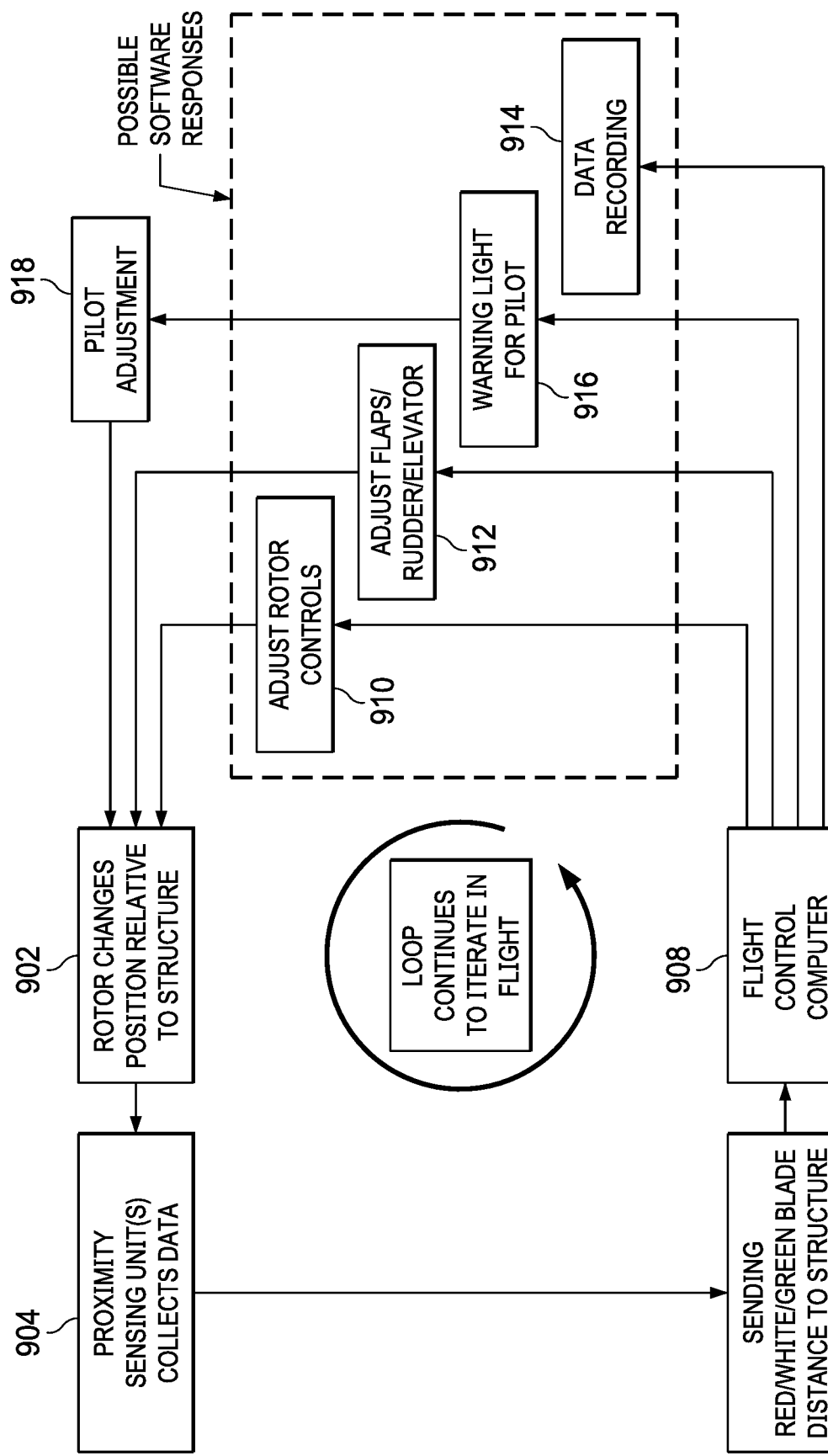
FIG. 9 is a flow diagram of a method for controlling distance between aircraft components.

FIG. 9 is a flow diagram of a method 900 for controlling distance between aircraft components. For purposes of discussion, FIG. 9 is described herein relative to FIGS. 1-4. At block 902, the rotor blades 119 change position relative to non-rotating components of the tilt-rotor aircraft 100. At block 904, the proximity sensor 406 collects data about a position of the rotor blades 119 relative to the non-rotating components of the tilt-rotor aircraft 100. At block 906, a distance of each rotor blade 119 from the non-rotating aircraft component is transmitted to a flight control computer 304. At block 908, if the distance between the rotor blade 119 and the non-rotating aircraft component is less than a defined minimum safe distance, the flight control computer 304 initiates one or more corrective actions. By way of example, the corrective actions may include adjustment of rotor controls (shown in block 910), adjustment of flight control surfaces such as, for example, flaps, rudder, and elevators (shown in block 912), data recording (shown in block 914), and providing a warning indication to the pilot (shown in block 916). In various embodiments, the warning indication could be, for example, a warning light, an audible alarm, a vibration of the pilot's seat, and the like. In embodiments, where a warning indication is provided to the pilot, at block 918, the pilot adjusts the controls of the tilt-rotor aircraft 100 in an effort to take corrective action.

Figure 10:
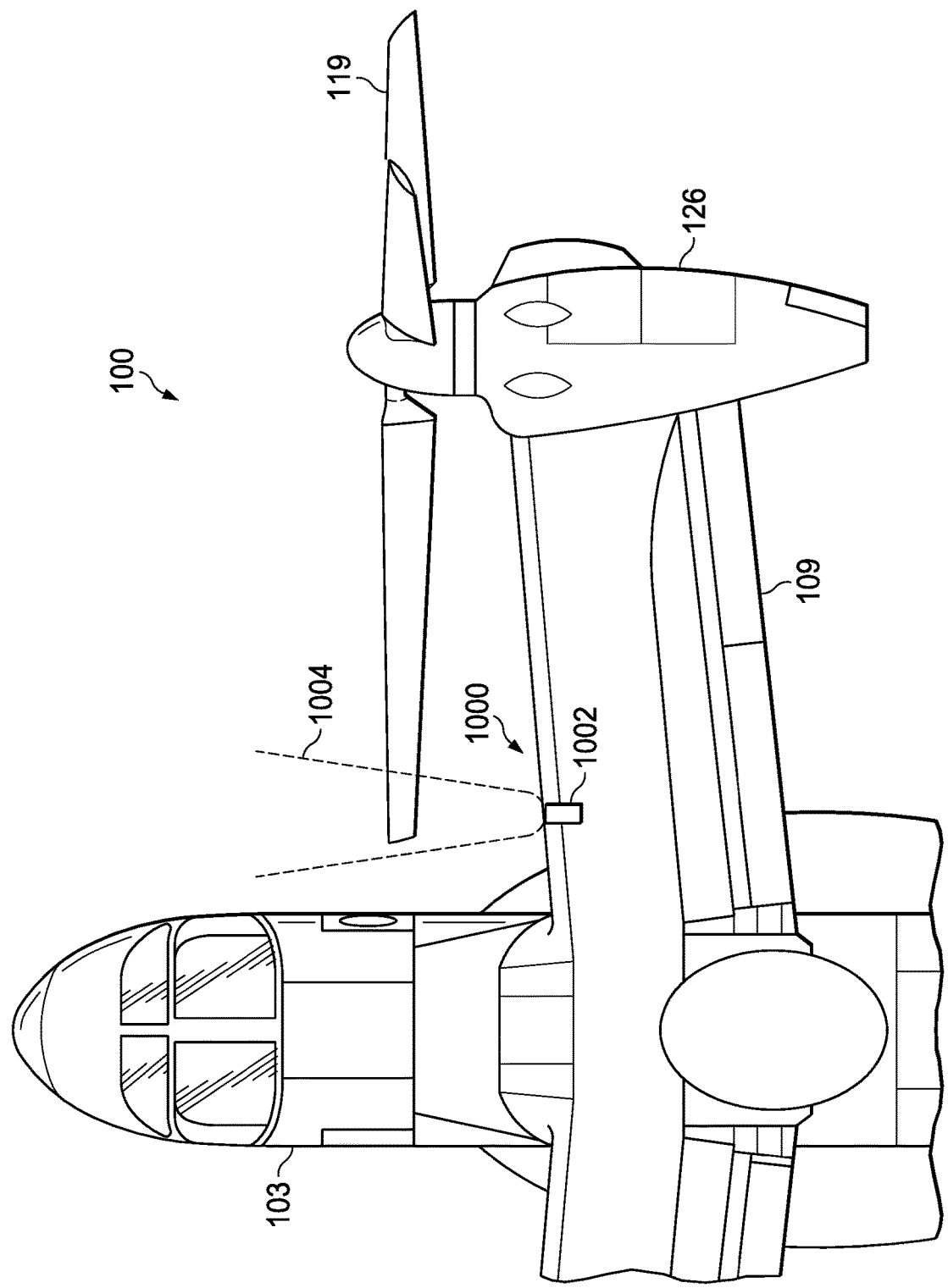
FIG. 10 is a partial top view of a tilt-rotor aircraft that includes an ultrasonic proximity system.

FIG. 10 is a partial top view of the tilt-rotor aircraft 100 operating in the airplane mode and illustrating an ultrasonic proximity system 1000. For purposes of discussion, FIG. 10 is described herein relative to FIGS. 1-9. Ultrasonic proximity system 1000 includes a proximity sensor 1002 that is embedded in an exterior surface of wing 109 and is used to measure a distance between the plurality of rotor blades 119 and a non-rotating aircraft component, such as wing 109. Proximity sensor 1002 emits ultrasonic sound waves toward the plurality of rotor blades 119. In some aspects, ultrasonic sound waves are directed outward from proximity sensor 1002 in a cone-shaped pattern 1004. As illustrated in FIG. 10, proximity sensor 1002 is oriented on wing 109 so that cone-shaped pattern 1004 encompasses a tip region of each rotor blade 119 (e.g., tip regions 404, 806, and 812). In other aspects, proximity sensor 1002 may be directed at other portions of the plurality of rotor blades 119.

During operation of ultrasonic proximity system 1000, some of the ultrasonic sound waves emitted by proximity sensor 1002 reflect off of the plurality of rotor blades 119 and return to proximity sensor 1002. Proximity sensor 1002 measures an amount of time that it takes for the ultrasonic sound waves to travel from proximity sensor 1002 to a blade of the plurality of blades 119 and back to proximity sensor 1002. This amount of time can then be used to determine a distance between proximity sensor 1002 and one of the plurality of rotor blades 119. For example, the distance can be calculated using Equation 1 below:

$$d = \frac{1}{2}\lambda t \qquad \text{Equation 1}$$

In Equation 1, d is the distance between proximity sensor 1002 and one of the plurality of rotor blades 119, λ is the frequency of the emitted sound waves, and t is the amount of time that it takes for the sound waves to travel to and from the proximity sensor 1002. In some aspects, proximity sensor 1002 supplies data regarding the distance between the plurality of rotor blades 119 and, for example, wing 109 to flight control computer 304. As discussed relative to FIG. 9, if flight control computer 304 determines, based upon the distance measured by proximity sensor 1002, that the distance between a rotor blade 119 and the non-rotating aircraft component (e.g., wing 109) is less than a defined minimum safe distance, flight control computer 304 can initiate one or more of the corrective actions discussed above relative to FIG. 9.

Figure 11:
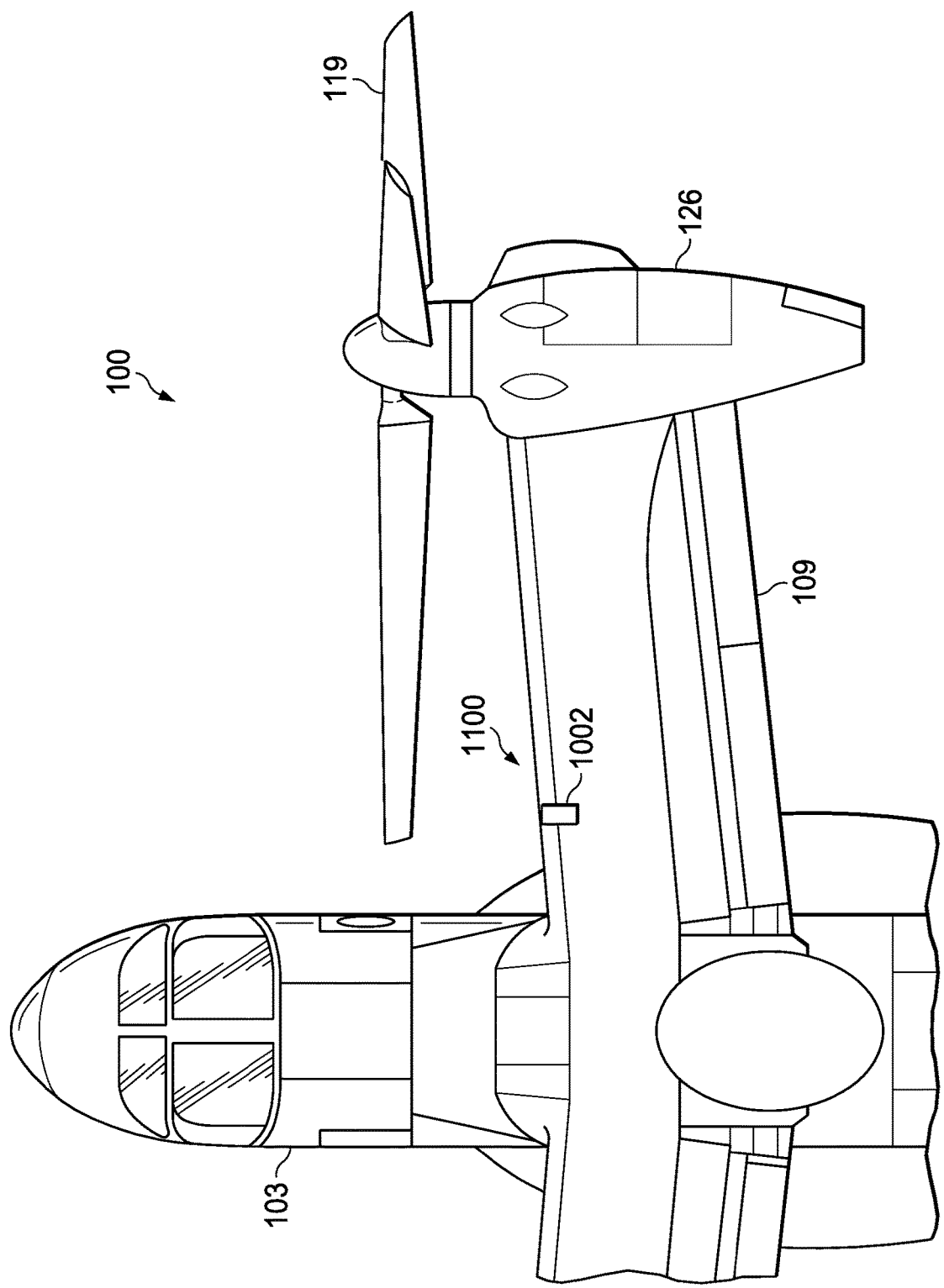
FIG. 11 is a partial top view of a tilt-rotor aircraft that includes a barometric pressure proximity system.

FIG. 11 is a partial top view of the tilt-rotor aircraft 100 operating in the airplane mode and illustrating a barometric proximity system 1100. For purposes of discussion, FIG. 11 is described herein relative to FIGS. 1-10. Barometric proximity system 1100 is similar to ultrasonic proximity system 1000, but relies upon air pressure readings to detect the proximity of the plurality of rotor blades 119 to a non-rotating aircraft component, such as wing 109. Barometric proximity system 1100 includes a proximity sensor 1102 that is embedded in an exterior surface of wing 109. Proximity sensor 1102 is embedded into wing 109 so that a distance between the plurality of rotor blades 119 and wing 109 can be determined using proximity sensor 1102. Proximity sensor 1102 measures air pressure in an area proximate proximity sensor 1102.

During operation of tilt-rotor aircraft 100, the plurality of rotor blades 119 rotate to generate thrust. The creation of thrust also results in the creation of pressure waves that emanate from the plurality of rotor blades 119. A magnitude of these pressure waves is greatest closest to the rotor blade and diminishes as a distance from the rotor blade increases. Measuring air pressure via proximity sensor 1102, a distance between the plurality of rotor blades 119 and proximity sensor 1102, and thus wing 109, can be determined. In general, as the plurality of rotor blades 119 move closer to wing 109 (e.g., as a result of flapping or coning forces), the magnitude of the pressure measured by proximity sensor 1102 increases. Thus, proximity sensor 1102 monitors pressure to determine if one or more blades of the plurality of rotor blades 119 has moved too close to wing 109. As discussed relative to FIG. 9, if flight control computer 304 determines, based upon the distance measured by proximity sensor 1102, that the distance between one or more rotor blades of the plurality of rotor blades 119 and the non-rotating aircraft component is less than a defined minimum safe distance, flight control computer 304 can initiate one or more of the corrective actions discussed above.

In some aspects, distance between the plurality of rotor blades 119 and fuselage 103 can be determined through empirical testing using proximity sensor 1102. For example, testing can be performed to determine pressure readings at various operating conditions. For example, operating conditions may include: air speed, rotor speed, number of rotors, air temperature, baseline air pressure (e.g., ambient pressure), wind speed, wind direction, and the like. Through testing, a look-up table of pressures under a wide variety of operating conditions can be created and referenced during flight by flight control computer 304. For example, flight control computer 304 can compare data collected by proximity sensor 1102 with data stored in the look-up table. Using the look-up table, flight control computer 304 can determine a proximity of the plurality of rotor blades 119 to wing 109. If flight control computer 304 determines that one or more rotor blades of the plurality of rotor blades 119 is too close to wing 109, flight control computer 304 can initiate one or more of the corrective actions discussed above relative to FIG. 9.

Figure 12:
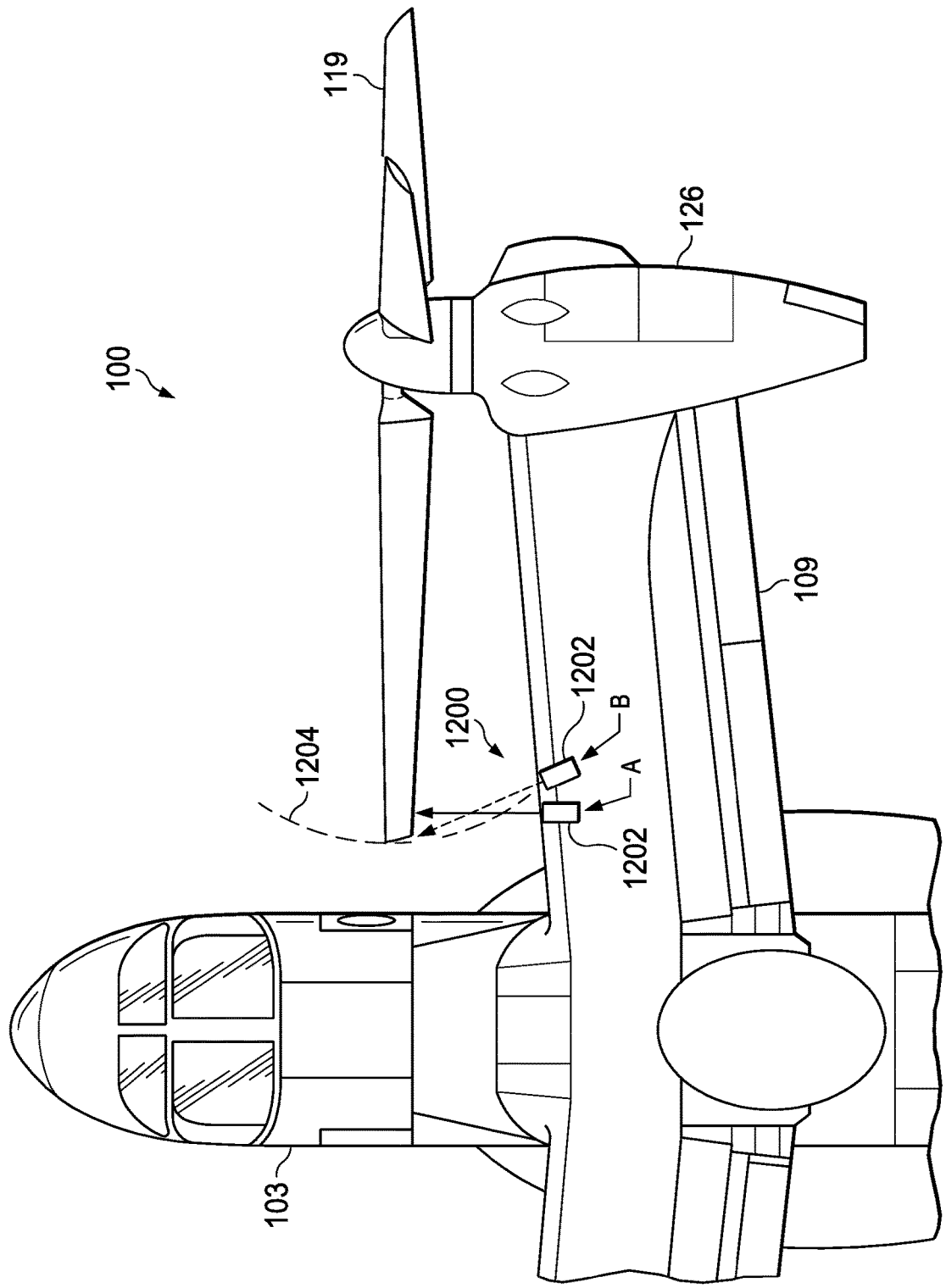
FIG. 12 is a partial top view of a tilt-rotor aircraft that includes a LiDAR proximity system.

FIG. 12 is a partial top view of the tilt-rotor aircraft 100 operating in the airplane mode and illustrating a LiDAR proximity system 1200. For purposes of discussion, FIG. 12 is described herein relative to FIGS. 1-11. LiDAR proximity system 1200 includes a proximity sensor 1202 that is embedded in an exterior surface of wing 109. Proximity sensor 1202 can comprise a LiDAR sensor and is embedded into wing 109 so that a distance between the plurality of rotor blades 119 and a non-rotating aircraft component, such as wing 109, can be determined using proximity sensor 1202. Proximity sensor 1202 is positioned to direct light waves toward the plurality of rotor blades 119. In some aspects, proximity sensor 1202 emits laser light (e.g., between light having wavelengths of about 600-1000 nm). In some aspects, proximity sensor 1202 emits light at a frequency that is synchronized with a rotation of plurality of rotor blades 119 to ensure that the emitted light hits a rotor blade of the plurality of rotor blades 119. In some aspects, proximity sensor 1202 emits light at a high frequency to ensure that emitted light hits a rotor blade of the plurality of rotor blades 119.

Proximity sensor 1202 may be mounted in various locations and orientations on wing 109. In one aspect, proximity sensor 1202 is located at position A on wing 109. At position A, proximity sensor 1202 directs light waves forward (i.e., within approximately +/− ten degrees of parallel to a mast that drives the plurality of rotor blades 119). Position A, as illustrated in FIG. 12, is slightly offset from the tips of the plurality of rotor blades 119 toward nacelle 126. This offset ensures that the emitted light waves are always within the path of the plurality of rotor blades 119. Dashed curve 1204 illustrates an exemplary arc or range of motion about which the plurality of rotor blades 119 may teeter in response to various dynamic forces that are imposed upon the plurality of rotor blades 119 during flight. If proximity sensor 1202 were placed too far inboard on wing 109, it becomes possible for the plurality of rotor blades 119 to dip out of the path of the light waves. In order to avoid a situation where the light waves emitted by proximity sensor 1202 miss the plurality of rotor blades 119, position A is located near an intersection of dashed curve 1204 and wing 109. In some aspects, proximity sensor 1202 is positioned within approximately five inches of the intersection of dashed curve 1204 and wing 109 (on either side thereof). Generally speaking, the placement of proximity sensor 1202 depends on the particular characteristics of the aircraft.

In another aspect, proximity sensor 1202 is located at position B on wing 109. At position B, proximity sensor 1202 is oriented to direct light waves inboard at an acute angle relative to the light waves from proximity sensor 1202 (e.g., an acute angle relative to an axis parallel to a mast of the rotor that drives the plurality of rotor blades 119). The angle of proximity sensor 1202 depends on the geometries of a particular aircraft. In some aspects, the angle may be between approximately 5° and 45°. Angling proximity sensor 1202 inboard as shown allows proximity sensor 1202 to more closely monitor a position of the tips of the plurality of rotor blades 119 as the plurality of rotor blades 119 move closer to wing 109 since proximity sensor 1202 is generally oriented along an approximately tangential path of dashed curve 1204.

During operation of LiDAR proximity system 1200, some of the light waves emitted by proximity sensor 1202 reflect off of the plurality of rotor blades 119 and return to proximity sensor 1202. Proximity sensor 1202 measures an amount of time that it takes for the light waves to travel from the proximity sensor 1202 to a blade of the plurality of blades 119 and back to proximity sensor 1202. This amount of time can then be used to determine a distance between proximity sensor 1202 and the plurality of rotor blades 119. The distance can be calculated using Equation 1 above.

In some aspects, proximity sensor 1202 supplies data regarding the distance between the plurality of rotor blades 119 to flight control computer 304. As discussed relative to FIG. 9, if flight control computer 304 determines, based upon the distance measured by proximity sensor 1202, that the distance between the rotor blade 119 and the non-rotating aircraft component (e.g., wing 109) is less than a defined minimum safe distance, flight control computer 304 can initiate one or more of the corrective actions discussed above relative to FIG. 9.

Figure 13:
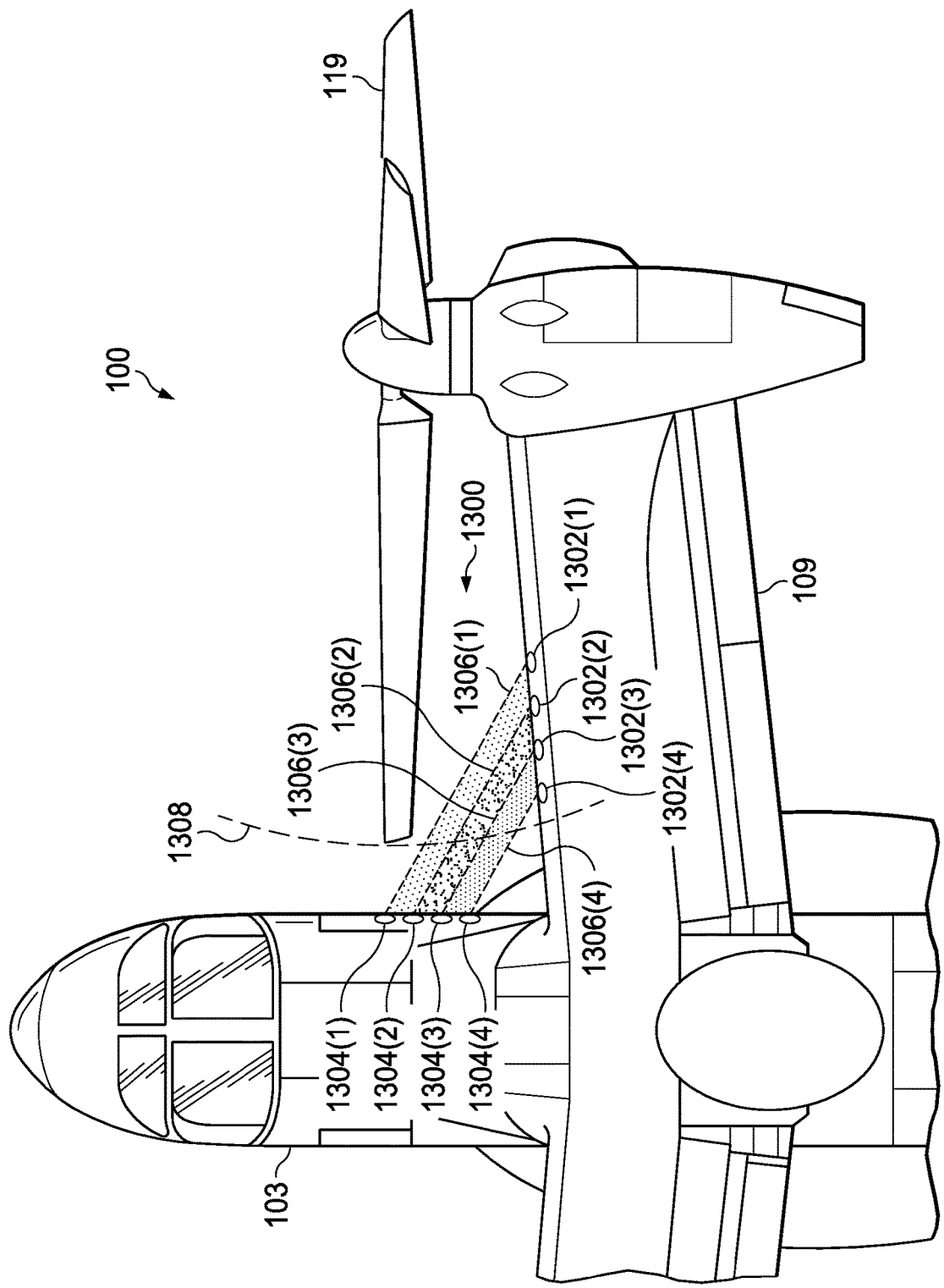
FIG. 13 is a partial top view of a tilt-rotor aircraft that includes a tripwire proximity system.

FIG. 13 is a partial top view of the tilt-rotor aircraft 100 operating in the airplane mode and illustrating a tripwire proximity system 1300. For purposes of discussion, FIG. 13 is described herein relative to FIGS. 1-12. Tripwire proximity system 1300 includes proximity sensors comprising a plurality of light sources 1302 embedded in an exterior surface of wing 109 and a plurality of receivers 1304 that are embedded in an exterior surface of fuselage 103. As illustrated in FIG. 13, four light sources 1302(1)-(4) are embedded in wing 109. Each light source 1302(1)-(4) is directed toward a corresponding receiver 1304(1)-(4), respectively, located on fuselage 103. In various aspects, as few as one, two, or three light sources 1302 or more than four may be used. In some aspects, the light sources 1302(1)-(4) may be located on fuselage 103 and receivers 1304(1)-(4) may be located on wing 109. In other aspects, one or more light sources 1302 may be located on wing 109 and one or more light sources 1302 may be located on fuselage 103, with receivers 1304 positioned accordingly to form matched pairs.

Each light source 1302/receiver 1304 pair forms a tripwire 1306 in the form of a beam of light for detecting the proximity of the plurality of rotor blades 119 relative to a non-rotating aircraft component, such as wing 109, as the plurality of rotor blades 119 move during flight. The term "tripwire" is used herein to describe beams of light (both visible and non-visible) that can be "tripped" when an object interrupts the path of the beam of light. As illustrated in FIG. 13, four tripwires 1306(1)-(4) are created by light sources 1302(1)-(4)/receivers 1304(1)-(4). Each light source 1302(1)-(4) directs a beam of light toward its corresponding receiver 1304(1)-(4), respectively. If an object (e.g., a rotor blade) interrupts a beam of light, the receiver 1304 that is no longer being targeted with light sends a signal to flight control computer 304 indicating that the plurality of rotor blades 119 have entered the zone of that particular light source 1302/receiver 1304 pairing. As illustrated in FIG. 13, multiple light source\receiver pairings (e.g., light sources 1302(1)-(4)/receivers 1304(1)-(4)) can be used to create a stepped proximity detection system as shown. For example, light source 1302(1) and receiver 1304(1) are positioned closest to the path of travel of the plurality of rotor blades 119 and light source 1302(4) and receiver 1304(4) are positioned farthest from the path of travel of the plurality of rotor blades 119. As the plurality of rotor blades 119 move progressively closer to wing 109, tripwires 1306(1)-(4) are successively tripped. Using this stepped arrangement, flight control computer 304 gets information about the proximity of the plurality of rotor blades 119 to wing 109. A person of skill in the art will recognize that more or fewer tripwires 1306 may be created by adding or removing light source/receiver pairs as desired.

In response to receiving a signal that a tripwire 1306 has been tripped, flight control computer 304 may respond in various ways. For example, flight control computer 304 may determine that tripping tripwire 1306(1) does not merit a corrective action as some deflection of the plurality of rotor blades 119 is within normal operating parameters. In response to receiving a signal that tripwire 1306(2) has been tripped, flight control computer 304 may initiate corrective action (e.g., a warning) indicating that the plurality of rotor blades 119 has moved into closer proximity to wing 109. In some aspects, flight control computer 304 may only issue a warning if tripwire 1306(2) is tripped. In response to receiving a signal that tripwire 1306(3) has been tripped, flight control computer 304 may take any of a variety of corrective actions, such as an adjustment of rotor controls (e.g., as shown in block 910), an adjustment of flight control surfaces such as, for example, flaps, rudder, and elevators, and the like. A person of skill in the art will appreciate that flight control computer 304 may be configured to respond as desired in response to any tripwire 1306 being tripped. The examples discussed herein are for the purposes of illustration and are not meant to be limiting.

In some aspects, proximity system 1300 can utilize different types of proximity sensors 1302 and/or receivers 1304. For example, proximity system 1300 can use through-beam sensors (e.g., laser emitter and receiver), LiDAR sensors (e.g., laser range finder), or ultrasonic sensors.

It should be understood that the various proximity systems disclosed herein may be combined to create redundant systems for monitoring proximity of the plurality of rotor blades 119 to wing 109. For example, and not by way of limitation, two or more of proximity systems 1000, 1100, 1200, and 1300 may be combined.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms, methods, or processes). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," "generally in the range of," and "about" may be substituted with "within [a percentage] of" what is specified, as understood by a person of ordinary skill in the art. For example, within 1%, 2%, 3%, 5%, and 10% of what is specified herein.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. An aircraft rotor-proximity detection system comprising:
    a rotor having a plurality of rotor blades;
    a first proximity sensor disposed in a non-rotating aircraft component and configured to detect a proximity of a rotor blade of the plurality of rotor blades to the non-rotating component; and
    a flight control computer in communication with the first proximity sensor.

2. The aircraft rotor-proximity detection system of claim 1, wherein the first proximity sensor is configured to emit ultrasonic sound waves toward the plurality of rotor blades.

3. The aircraft rotor-proximity detection system of claim 1, wherein the first proximity sensor is configured to measure air pressure.

4. The aircraft rotor-proximity detection system of claim 1, wherein the first proximity sensor is configured to emit light waves toward the plurality of rotor blades.

5. The aircraft rotor-proximity detection system of claim 4, wherein the first proximity sensor is oriented at an acute angle relative to an axis parallel to a mast of the rotor.

6. The aircraft rotor-proximity detection system of claim 1, wherein the first proximity sensor comprises a light source and a receiver that form a first tripwire therebetween.

7. The aircraft rotor-proximity detection system of claim 6, wherein the flight control computer is configured to issue a warning responsive to the first tripwire being tripped by the plurality of rotor blades.

8. The aircraft rotor-proximity detection system of claim 6, comprising:
    a second proximity sensor disposed in the non-rotating aircraft component;
    wherein the second proximity sensor comprises a light source and a receiver that form a second tripwire therebetween.

9. The aircraft rotor-proximity detection system of claim 8, wherein the flight control computer is configured to take a corrective action responsive to the second tripwire being tripped.

10. The aircraft rotor-proximity detection system of claim 9, wherein the corrective action comprises adjusting at least one of a nacelle position, a rotor-blade position, a rotor speed, and a control surface position.

11. The aircraft rotor-proximity detection system of claim 1, comprising:
    at least one of an actuator and a servo motor electrically coupled to the flight control computer; and
    wherein the flight control computer is operable to signal the at least one of the actuator and the servo motor to adjust a flight parameter responsive to a determination that the plurality of rotor blades are less than a minimum safe distance from the non-rotating aircraft component.

12. The aircraft rotor-proximity detection system of claim 11, wherein the flight parameter includes at least one of a nacelle position, a rotor-blade position, a control surface position, or a landing gear position.

13. An aircraft rotor-proximity detection system comprising:
   a rotor having a plurality of rotor blades;
   a proximity sensor disposed in a non-rotating aircraft component, the proximity sensor configured to detect a proximity of the plurality of rotor blades to the non-rotating aircraft component by performing at least one of the following: emitting light waves toward the plurality of rotor blades, creating a tripwire for detection of a rotor blade of the plurality of rotor blades, measuring air pressure to determine a proximity of a rotor blade of the plurality of rotor blades, emitting ultrasonic soundwaves toward the plurality of rotor blades; and
   wherein the proximity sensor is configured to present a warning to a pilot responsive to the plurality of rotor blades being located at least a minimum safe distance from the non-rotating aircraft component.

14. The aircraft rotor-proximity detection system of claim 13, wherein the warning comprises at least one of a warning light, an audible alarm, and a vibration of a pilot's seat.

15. The aircraft rotor-proximity detection system of claim 13, comprising a flight control computer in communication with the proximity sensor and configured to take a corrective action responsive to the plurality of rotor blades being located at least a minimum safe distance from the non-rotating aircraft component.

16. A method of controlling rotor-blade clearance, the method comprising:
   measuring, via a proximity sensor disposed within a non-rotating component, a position of a rotor blade relative to the non-rotating aircraft component;
   determining, via a flight control computer, if the rotor blade is located at least a minimum safe distance from the non-rotating aircraft component; and
   responsive to a negative determination, initiating, via the flight control computer, a corrective action.

17. The method of claim 16, wherein the proximity sensor is configured to emit ultrasonic sound waves toward the rotor blade.

18. The method of claim 16, wherein the proximity sensor is configured to measure air pressure.

19. The method of claim 16, wherein the proximity sensor is configured to emit light waves toward the rotor blade.

20. The method of claim 16, wherein the proximity sensor comprises a light source and a receiver that form a tripwire therebetween.

* * * * *